Feb. 5, 1957  G. A. ANDERSON  2,780,596
NEUTRONIC REACTOR
Filed Nov. 6, 1950  3 Sheets-Sheet 1

INVENTOR.
BY George A. Anderson
ATTORNEY

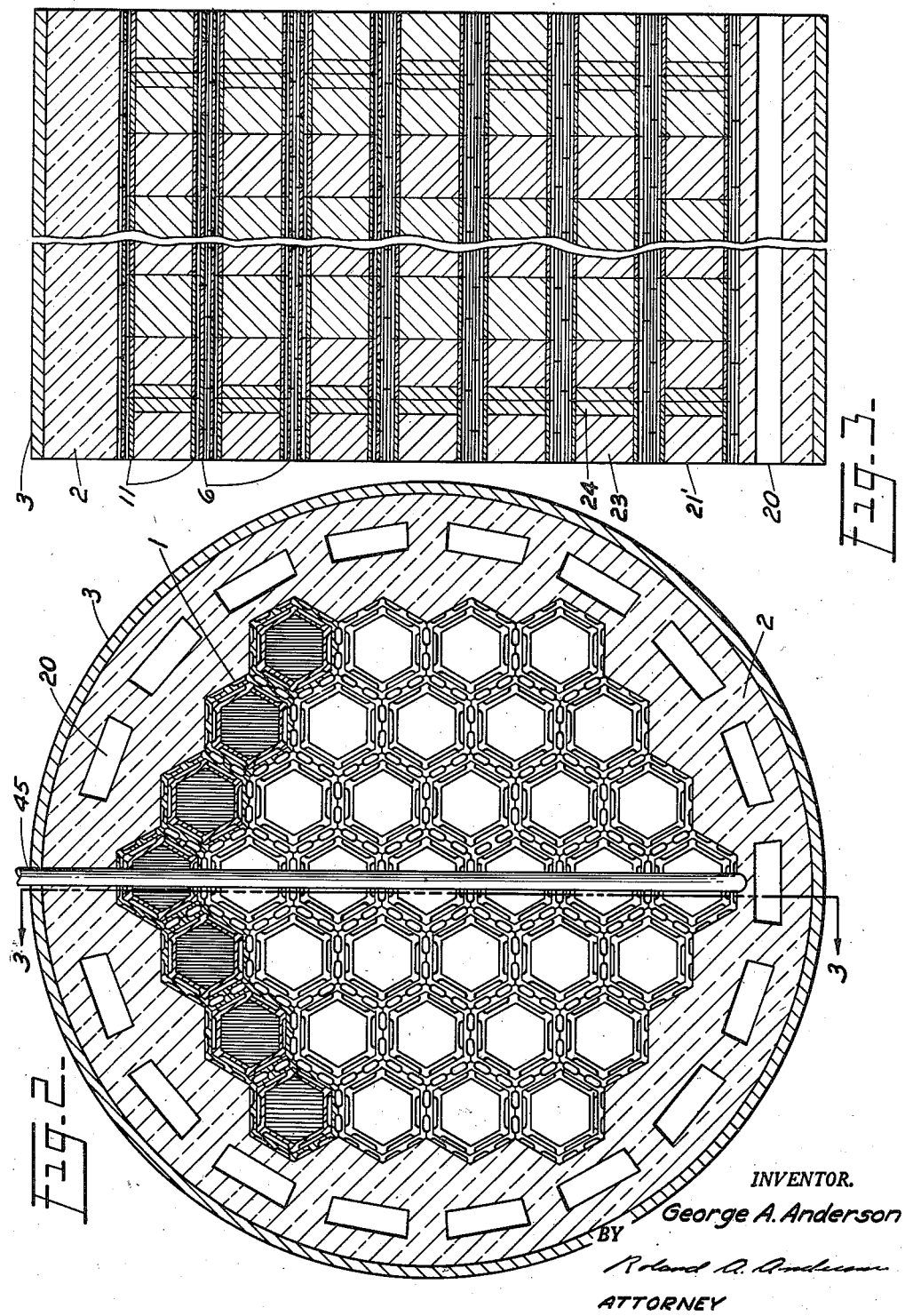

Feb. 5, 1957 G. A. ANDERSON 2,780,596
NEUTRONIC REACTOR
Filed Nov. 6, 1950 3 Sheets-Sheet 3

INVENTOR.
George A. Anderson
BY
ATTORNEY

United States Patent Office 2,780,596
Patented Feb. 5, 1957

2,780,596

NEUTRONIC REACTOR

George A. Anderson, Chicago Heights, Ill., assignor to the United States of America as represented by the United States Atomic Energy Commission Application November 6, 1950, Serial No. 194,331

1 Claim. (Cl. 204—193)

This invention relates generally to the neutronic reactor art, and it is particularly concerned with a novel structure and arrangement of the components of a neutronic reactor, especially the active portion or core thereof.

As used in this specification and in the appended claims, the following terminology is defined as indicated below:

Thermal neutrons (slow neutrons)—Neutrons having a substantially Maxwellian number-energy distribution characteristic about an energy value equal to $kt$, where $k$ is a constant and $t$ is the temperature in degrees, Kelvin. ($kt$=0.025 electron volts at 15 degrees centigrade.)

Fission—The splitting of an atomic nucleus, upon the absorption of a neutron, into a plurality of fragments of greater mass than that of an alpha particle, the splitting being accompanied by the release of energy and a plurality of neutrons.

Fissionable—Having the ability to undergo fission upon the absorption of a slow neutron.

Slow neutron absorber—An atomic nucleus having a slow neutron absorption cross section greater than 100 barns.

Moderator material—A non-gaseous material for which the ratio $$\frac{\xi \sigma_s}{\sigma_a}$$

is greater than 10, wherein $\xi$ is the average loss in the logarithm of the energy of a fast neutron per elastic collision within the material, $\sigma_s$ is the slow neutron elastic scattering cross section per atom of the material, and $\sigma_a$ is the slow neutron absorption cross section per atom of the material.

As is now well known, by massing together sufficient fissionable material under appropriate conditions, a neutron reactive system may be formed, which system, by reason of its ability to generate neutrons at an equal or greater rate than they are being lost to the system as a result of absorption in the system or leakage from the system, is capable of maintaining a self-sustained chain reaction of neutron induced fission. Such a system has been termed a neutronic reactor or "pile." A detailed description of the theory and practice of the design, construction, and operation of reactors generally is set forth in the Science and Engineering of Nuclear Power, Addison Wesley Press, Inc., Cambridge, Massachusetts, vol. 1 (1947), and vol. 2 (1949). Reference is made particularly to chapters 4, 5, 6, 8 and 9 of vol. 1 of that publication. Any terminology not specifically defined herein is used in the sense defined on pages 112 to 115 of Goodman, vol. 1.

For whatever purpose a neutronic reactor may be employed, it may be said that the utility of the reactor is, in general, proportional to the maximum power level at which it may be operated. The maximum operating power level, of course, is dependent upon the maximum rate at which heat may be removed from the reactor. Accordingly, it is the primary object of the present invention to provide a novel structural arrangement of a reactor, particularly the heat producing active portion thereof, which is especially efficient from a heat transfer standpoint, that is, it is especially adapted to a high rate of heat removal therefrom.

For some purposes, such as where the heat removed is intended to be used for heating purposes or for generation of power, the utility of the reactor is also dependent upon the temperature of heat removal, that is, the exit temperature of the cooling medium. It is, therefore, another object of the present invention to provide a reactor adapted to heat the cooling medium to a sufficiently high temperature to be useful for heating and/or power generation purposes.

Still another object of the present invention is to provide a neutronic reactor wherein the fissionable material is fairly uniformly distributed over the active portion volume, this uniform distribution being advantageous with respect to high rate of heat transfer, low differential between the peak temperature of the reactor materials and that of the cooling medium, and alleviation of temperature stresses in the reactor materials.

In accordance with the principles of the present invention, the above objects are achieved by a special design of the active portion of the neutronic reactor. In such special design, the active portion comprises a permanent supporting structure of skeleton form which is built up of a plurality of open-ended hollow prisms arranged side against side, and end against end, in aligned relationship. The outer sides of the prisms have recesses cut therein extending the entire length of the prisms. The recesses thus formed provide channels for the passage of coolant between adjacent sides of prisms. Into the channels formed by the hollow interiors of the aligned prisms are charged a plurality of fuel elements. These fuel elements each comprise a hollow open-ended frame having a shape identical with that of the prisms forming the permanent structure. Supported by and within each of these frames is a plurality of spaced rectangular plates containing the fissionable material which actually supports the chain reaction, the space between adjacent plates providing a cooling channel for the passage of coolant. Outwardly projecting runners are provided at each corner of the frames and extending the length thereof so as to separate the sides of the frames from the adjoining sides of the prisms, to thereby form additional coolant channels between the outer surface of the frames and the inner surface of the prisms.

Other objects and advantages of the present invention will become apparent from the following detailed description, when taken in connection with the accompanying drawings, wherein, Fig. 1 is a general arrangement perspective view, partially broken away, showing the entire reactor of the present invention. All parts broken away are shown in section. The upper right hand quadrant of that portion of the reactor to the rear of retaining plate 4 is shown removed, and for the most part, those portions forward of retaining plate 4, other than the lower left hand quadrant are shown removed;

Fig. 2 is a cross sectional view of the active portion and reflector of that reactor of Fig. 1 taken looking along the direction of coolant flow, that is, from front to rear of Fig. 1;

Fig. 3 is a cross sectional elevation view of the active portion and reflector taken looking along the arrows 3—3 of Fig. 2;

Figure 1:
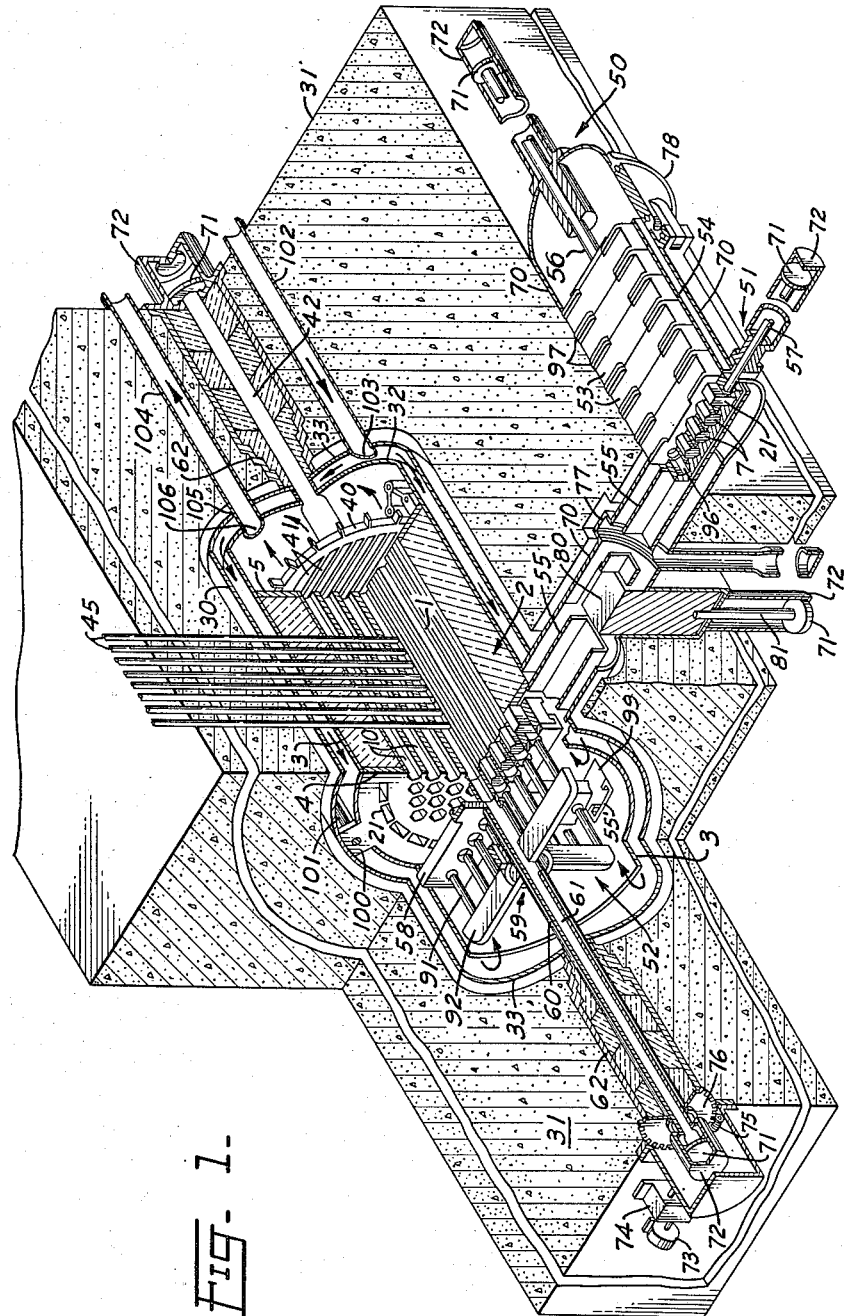

Referring now to the drawings, the active portion 1 and surrounding reflector 2 together form an elongated cylinder which is retained peripherally by the cylindrical shell 3, preferably formed of austenitic steel. This cylinder is retained at its forward end by an apertured steel retaining plate 4, and at its rearward end by another apertured steel retaining plate 5.

Figure 4:
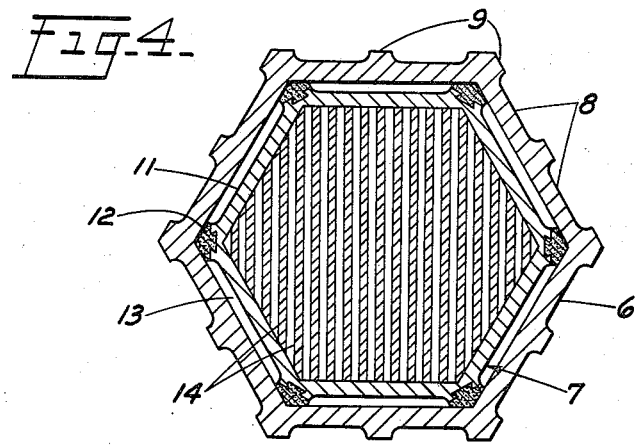
Fig. 4 is a cross sectional view taken looking along the direction of coolant flow of a single fuel element in operative association with one of the basic prism elements from which the permanent structure of the active portion is formed.

As best illustrated in Fig. 2, the active portion 1 has a generally hexagonal cross section which is built up of a large number of small hollow prisms 6, preferably in the form of hexagons, as shown in Fig. 4. The basic structural elements or prisms 6 are stacked side against side, and end against end, to form the permanent skeleton structure of the active portion, the hollow interior of the aligned prisms forming fuel channels 10 into which the fuel elements 7 can be inserted. As shown in Fig. 4, each of the outer sides of the prisms 6 are recessed, as at 8, thereby forming outwardly projecting lugs 9 at each of the corners and between each corner. When the prisms 6 are stacked side against side, the lugs 9 of adjoining prisms abut, and the adjacent recessed portions 8 form longitudinally extending passageways through which the cooling medium may flow to cool the permanent structure.

As shown in Fig. 3, different length prisms are used at the ends of adjacent channels in order to stagger the joints between prisms in the entire assembly. It will be appreciated that use of a large number of small prisms to form the permanent skeleton structure reduces the likelihood of encountering a large temperature difference within any one element and thus reduces thermal stresses.

The fuel elements 7 each comprise an outer hollow open-ended frame 11 having the same cross sectional shape as the prism 6, that is, hexagonal in the example illustrated. The frames 11 may be of a length comparable to that of the prisms 6 so that a plurality of fuel elements may be charged into a single one of the fuel element channels 10 formed by the aligned prisms 6, as best illustrated in Fig. 3. At each of the outer corners of the frame 11, there is provided an outwardly projecting shoe or runner 12 which extends the entire length of the frame 11. As shown in Fig. 4, the runners 12 cooperate with the inner corners of the associated prism 6 thereby forming longitudinally extending coolant channels 13 through which the coolant may flow to cool the inner surface of the prism 6 and the outer surface of the frames 11.

Supported by and within the frames 11 are a number of spaced rectangular fuel plates 14 containing the fissionable material which supports the chain reaction. The fuel plates 14 are disposed in a vertical longitudinally extending plane so as to provide rectangular cooling channels through which the cooling medium may flow to cool the plates and so as to minimize any tendency the slabs may have to sag at operating temperatures.

The prisms 6 and the frames 7 are formed of a moderator material, such as beryllium, beryllium oxide, or beryllium carbide, beryllium being preferred. The runners 12 are preferably formed of graphite since graphite is a moderator material, which, in addition, has a self-lubricating characteristic which will avoid any tendency for the runners 12 to bind against the inner corners of the prisms 6. The rectangular plates 14 contain a fissionable material, such as U-233, U-235, or Pu-239, and also contain a moderator material, such as beryllium, beryllium oxide, or beryllium carbide. Preferably, the fuel plates 14 contain the fissionable material and moderator in the form of a beryllium-uranium alloy.

Filling the space between the hexagonal active portion 1 and the cylindrical retaining shell 3 is the reflector region 2 which, for the most part, is solid, and may be built up of a large number of solid blocks of a suitable moderator material, again preferably beryllium. Approximately midway radially in the reflector region, a plurality of open channels 20 are left, into which channels may be removably inserted, if desired, a plurality of rectangular conversion elements 21. Conversion elements 21 will be understood to be formed in a manner similar to that of the fuel elements 7 except that the conversion elements are formed to have a rectangular cross section, as shown. Conversion elements 21 are provided with an outer rectangular frame similar to frame 11 of the fuel elements, this outer frame supporting a plurality of spaced rectangular conversion plates corresponding to the fuel plates 14 of the fuel elements. Instead of fissionable material, however, the plates of the conversion elements 21 contain a material which, upon absorbing a neutron, is converted either to an artificially radioactive isotope which it is desired to produce in quantity or to fissionable material. Thus, it can be considered that the conversion elements 21 form a cylindrical conversion zone circumscribing the active portion and dividing the reflector region 2 into a radially inner and radially outer reflector region.

As may be seen in Fig. 3, a similar conversion zone is provided forwardly and rearwardly of the active portion. This is accomplished by charging into the fuel element channels 10 of the active portion conversion elements 21' of a special design, two of these special conversion elements 21' being located at the forward end of each fuel element channel and two being located at the rearward end of each fuel element channel. Special conversion elements 21' are identical in every respect with the fuel elements 7 except that the rectangular plates 14 are divided into two longitudinally consecutive sections 23 and 24. The section 23 is formed entirely of moderator material, again preferably beryllium, and the section 24 contains the material which it is desired to convert to fissionable material or to an artifically radioactive isotope. The two special types of conversion elements 21' are disposed in back to back relationship, as shown in Fig. 3, to thereby form an inner reflector region, a conversion zone, and an outer reflector region at each end of the active portion.

As best illustrated in Fig. 1, the inner retaining shell 3 is supported from an outer cylindrical pressure shell 30, preferably of low alloy steel, through the steel retaining plates 4 and 5. The pressure shell 30, in turn, is supported by the massive structure 31 of concrete which also functions as the biological radiation shield for the reactor. The steel retaining plates 4 and 5 are fixedly attached to the inner shell 3, and, at several points around their periphery, these plates 4 and 5 are provided with ears 100 extending radially beyond the inner shell 3 to the pressure shell 30. The steel retaining plates 4 and 5 are held together axially by tie bolts 101, thus confining the reactor structure axially. While both plates 4 and 5 are supported from the pressure shell 30 by way of ears 100, only the one at the rearward end is axially anchored to the pressure shell 30, in order to accommodate axial expansion of the reactor structure.

The cylindrical retaining shell 3 extends forwardly and rearwardly beyond the plates 4 and 5, respectively, and at its forward end, it is left open, whereas, at its rearward end, it is terminated in a closed dome shaped end portion 32. The pressure shell 30 extends longitudinally beyond the termination of the retaining shell 3 in both directions and is closed by dome shaped end portions 33 at both ends.

The cooling medium is preferably helium under a high pressure, such as 10 atmospheres, and it enters the pressure shell 30 by way of an inlet conduit 102 extending through the shielding concrete 31 and terminating in a sealed opening 103 in the rear end portion 33 of the pressure shell 30. The high pressure helium flows forwardly, as indicated by the arrows, through the annular space formed between the pressure shell 30 and retaining shell 3 to the point at which the retaining shell 3 terminates. At this point, it reverses and flows rearwardly past a portion of the fuel element charging mechanism and then through the various coolant channels formed in the active portion and reflector. The heated helium is removed from the reactor by means of an exit cooling conduit 104 which passes through the shielding concrete 31, through a seal 105 in the rear end portion 33 of the pressure shell 30, and terminates at a sealed opening 106 in the end portion 32 of the retaining shell 3.

In order to prevent the fuel elements and conversion elements from being blown out of the rear of the reactor by the flowing helium, a fuel retaining grid 40 is provided adjacent the retaining plate 5. Grid 40 has a series of spaced barriers 41 which pass across the apertures in retaining plate 5 which are aligned with the fuel channels and conversion channels. The position of retaining grid 40 is controlled by a grid positioning ram 42 which passes through a seal in the rear end portions 32 and 33 of the retaining shell 3 and the pressure shell 30, respectively. The ram 42 terminates in a piston 71 disposed within a cylinder 72. The position of the piston 71 and grid 40 may thus be remotely controlled by appropriate variation of the fluid pressure within the cylinder 72. As shown, the ram 42 may be surrounded by a stepped shielding plug 62 to inhibit leakage of radiation along the ram.

A series of longitudinally spaced vertically movable control rods 45 are provided in order to control the operating power level of the reactor, these elements extending downwardly through gas tight seals in the steel shells 3 and 30 into wells formed in the active portion of the reactor along a central vertical plane thereof. In order to form these control rod accommodating wells, special prisms 6 and fuel elements 7, having a central aperture therein, are provided along the central vertical plane of the reactor, as indicated in Fig. 2. The control rods 45 are conventional elements and as is well known, they contain a suitable slow neutron absorber, such as, boron or cadmium, which materials have a particularly high slow neutron absorption cross section.

The fuel loading apparatus for the reactor may be considered as consisting of a cartridge positioning mechanism, indicated generally at 50, a cartridge loading mechanism, indicated generally at 51, and a fuel element charging mechanism indicated generally at 52. Briefly, the function of the cartridge positioning mechanism 50 is to transfer loaded fuel cartridges 53 from a longitudinally extending track-way 54, upon which the cartridges slide, to a perpendicular track-way 55, the cartridges being so transferred one at a time by suitable linear movement of a cartridge positioning ram 56. The transferred cartridge 53 is then moved along the track-way 55 by suitable linear movement of a cartridge loading ram 57 of the cartridge loading mechanism 51. The cartridge loading mechanism 51 serves to move the cartridge 53 along the track-way 55, and, at the termination of the track-way, to transfer the cartridge to one of four magazines 58, which magazines each form an index arm of a rotary device, indicated generally at 59, which device forms a part of the fuel element charging mechanism 52. The function of the fuel element charging mechanism is to rotate the loaded magazine 58 to an appropriate position by suitable rotation of a sleeve shaft 60, and this having been accomplished, to transfer the fuel elements and/or conversion elements from the cartridge 53 into the aligned channels of the reactor, this latter operation being effected by suitable reciprocation of a fuel element charging ram 61. The rotatable sleeve shaft 60 and the reciprocable fuel element charging ram 61 are concentric with the reactor and pass first through the dome shaped forward end portion 33 of the steel pressure shell 30 in sealed relationship therewith, and thereafter through a stepped shielding plug 62 in the shielding concrete 31.

The track-ways 54 and 55 are contained within a gas tight enclosure 70 which extends laterally from a point adjacent the forward end of the reactor. At the cartridge loading mechanism 51, this enclosure makes a 90° turn and then extends in a longitudinal direction to a point some distance beyond the rearward end of track-way 54. The cartridge loading ram 57 of the cartridge loading mechanism 51 extends through a suitable seal in the enclosure 70, and the cartridge positioning ram 56 of the cartridge positioning mechanism 50 also extends through a suitable seal in the enclosure 70. The reactor end of the enclosure 70 extends through a sealed aperture in the pressure shell 30 and terminates at a sealed opening in the retaining shell 3.

The reciprocable rams 56, 57, and 61 are linearly actuatable in any convenient manner externally to the shielding 31. These rams are illustrated as being remotely operable pneumatically or hydraulically by means of pistons 71 disposed within hydraulic cylinders 72. The rotatable sleeve shaft 60 is driven by a motor 73 connected through a gear box 74 to drive pinion gear 75, the pinion gear 75 engaging a gear 76 which is connected to actuate the sleeve shaft 60.

A valve 77 is interposed in the gas tight enclosure 70 so that that portion of the enclosure beyond the valve may be isolated from the remainder of the enclosure and from the high pressure helium system of the reactor proper. A second valve 78 is provided in the enclosure 70 whereby the enclosure may be opened to the atmosphere or sealed from the atmosphere, as desired, the valve 78 being large enough to permit manual insertion of loaded cartridges 53 into the enclosure 70 and onto the track-way 54. It will thus be apparent that that portion of the enclosure 70 beyond the valve 77 serves as a gas lock which may either be isolated from the high pressure helium system of the reactor proper and in communication with the atmosphere, or alternatively, may be sealed from the atmosphere and made a part of the high pressure helium system, depending upon the respective positions of the valves 77 and 78.

Also included in the enclosure 70, to the reactor side of the valve 77, is a vertically movable shielding block 80 which may be remotely actuated in any convenient way, again illustrated as by means of a ram 81 terminating in a piston 71 disposed within a hydraulic cylinder 72. The purpose of the shielding block 80, of course, is to prevent radiation streaming along the laterally extending portion of the enclosure 70. The shielding block 80 is in its extreme upper or radiation sealing position during the normal operation of the reactor, and is only lowered, as shown, during the operation of the loading apparatus.

Figure 5:
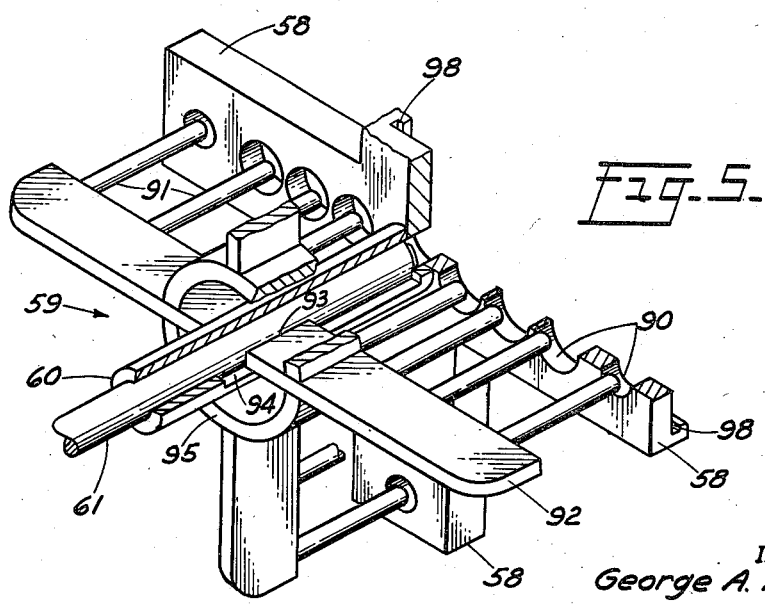
Fig. 5 is a perspective view of a detail of the fuel element charging mechanism of Fig. 1.

The rotary device 59 of the fuel element charging mechanism 52 is shown in considerable detail in Fig. 5. As there shown, the magazines or index arms 58 are four in number arranged ninety degrees apart, and they are carried by and rotate with the sleeve shaft 60, so that the loaded magazine may be positioned at any angular loading position desired. Each of the arms 58 is provided with a series of radially spaced holes 90 extending therethrough. Each of the holes 90 has associated therewith, in aligned relationship, a finger or plunger 91. Plungers 91 extend from, and are linearly movable with, four radial plunger arms 92, also arranged at 90 degree intervals around the rotary device 59. Two of the plunger arms 92 are attached directly to the fuel element charging ram 61, as indicated at 93, these two arms extending through axial slots 94 in the sleeve shaft 60. The other two plunger arms are attached to a circular yoke member 95, which, in turn, is attached to the other two plunger arms. By virtue of the above described construction of the rotary device 59, it will be apparent that rotation of sleeve shaft 60 effects rotation of the entire rotary device 59, including plunger arms 92 and index arms 58, and linear movement of the fuel element charging ram 61 effects a corresponding linear movement of plunger arms 92 and plungers 91 relative to the index arms 58.

The cartridges 53 comprise essentially solid blocks having a series of spaced apertures 96 therein, the innermost group of these apertures being of a shape to accommodate hexagonal fuel elements 7, and the outermost one of these apertures being of a shape to accommodate a conversion element 21. The cartridges 53 have on both edges of their upper and lower surfaces a plurality of pads 97. These pads may fit into guide rails (not shown) which may be provided along the track-way 55, if desired, to insure proper alignment of the cartridges. As best shown in Fig. 5, the magazines or index arms 58 are provided with upper and lower slots 98 into which the upper and lower pads at one edge of the cartridges 53 slide when the cartridges are transferred from the track-way 55 to the index arms 58. The cartridges 53 are somewhat wider than the length of the fuel elements and conversion elements, as may be seen in Fig. 1.

When it is desired to reload a particular channel of the reactor, or a particular group of radially aligned channels, the reactor is shut down, or at least its power level is reduced to a low value by suitable insertion of control rods 45. The valve 77 is then checked to insure that it is closed, isolating the portion of gas tight enclosure 70 beyond this valve from the reactor proper, and forming the above-described gas lock. The gas lock is then preferably purged of radioactive helium and filled with air at atmospheric pressure, after which the valve 78 is opened. A sufficient number of cartridges 53 to load an entire channel are then manually inserted within the gas lock and onto the track-way 54. After each cartridge 53 is inserted, the cartridge positioning mechanism 50 is actuated to move the inserted cartridge along the track-way a sufficient distance to make room for the next cartridge. The ram 56 of the cartridge positioning mechanism 50 is then withdrawn to permit the insertion of the next cartridge.

It will be understood that a large number of sets of identical cartridges 53 are available to the operator, these sets differing from each other in the positioning and spacing of the slots 96. That is, for each of the various predetermined angular loading positions of the rotary device 59, there is an associated set of cartridges 53, the spacing and position of the slots 96 of which correspond to the spacing and position of the radially aligned reactor channels at that particular angular loading position. At some angular loading positions, only one of the channels will be able to be serviced at one time, whereas, at some other angular loading positions, all of the channels are aligned and are able to be serviced simultaneously. It will be understood that the operator has chosen a set of cartridges 53 which are appropriate for the particular channel or aligned channels which it is desired to service, and that fuel elements 7 and/or conversion elements 21 had previously been inserted into the appropriate one or ones of the slots 96 of the cartridges 53.

The track-way 54 having been thus loaded with a particular set of cartridges 53, the valve 78 is closed and the valve 77 is opened and the shielding block 80 is lowered. The first loaded cartridge is then transferred to the track-way 55 by suitable manipulation of the cartridge positioning ram 56. This cartridge 53 is then moved along the track-way 55 and transferred to the aligned magazine or index arm 58 by suitable manipulation of the cartridge loading ram 57. The plunger arms 92 and extending plungers 91 are then moved inwardly a short distance, say about two inches, to an "intermediate" position by a corresponding movement of the fuel element charging ram 61. The effect of moving the charging ram 61 to its "intermediate" position is to permit the plungers 91 to move part way into the slots 96 of the cartridge 53 to thereby lock the cartridges at a fixed radial position with respect to the rotary device 59 and the reactor as a whole. For this purpose, it will be understood that the innermost slot 96 of all the cartridges terminates at the end adjacent the plungers in a section which corresponds closely to the diameter of the innermost plunger, so that a close fit is provided between the innermost plunger and this section of the innermost slot.

The cartridge 53 having been thus locked in position in the magazine 58, the rotary device 59 is rotated by means of sleeve shaft 60 until the contained fuel and/or conversion elements are aligned with the channels which are to be serviced. The charging ram 61 is then moved to its innermost position, thereby transferring the elements into the aligned channels of the reactor and ejecting the spent elements from the rear of the channels. In order that the spent elements may be so ejected, the retaining grid 40 had previously been withdrawn by retraction of the ram 42. The ejected spent element falls through a fuel element discharge opening (not shown) in the rear of the reactor and is removed through a discharge channel for chemical reprocessing.

Sleeve shaft 60 is then rotated until the magazine or index arm 58 containing the empty cartridge projects vertically downwardly in alignment with an opening 99 cut in the forward extension of the cylindrical retaining shell 3. Opening 99 provides access to a discharge track-way 55' and a gas tight enclosure, similar to enclosure 70, through which the empty cartridge may be discharged. In order to prevent damage to the cartridge a cartridge unloading mechanism (not shown) similar to the cartridge loading mechanism 51 may be provided. The empty cartridge is released from the downwardly projecting index arm 58 by linearly withdrawing the charging ram 61 to its outermost position. It will be apparent that in this angular position of the rotary device 59, another index arm 58 is aligned with track-way 55, and this index arm may be loaded with another loaded cartridge while the empty cartridge is being discharged through the opening 99, thus saving time in the loading operation.

The thus described loading process is repeated until all of the elements of the radially aligned channels being serviced have been replaced by new elements, that is, until all of the loaded cartridges 53 have been removed from the track-way 54 and discharged as empty cartridges through the opening 99.

If it is then desired to service another radially aligned group of channels associated with a different angular loading position of the rotary device 59, the entire above described process is repeated utilizing a different set of cartridges 53 corresponding to the new angular loading position. When all of the channels which require reloading have been thus serviced, the retaining grid 40 is again forced up against retaining plate 5 by actuation of the ram 42, the shielding block 80 is returned to its uppermost position and the valve 70 is closed. The reactor may then be returned to its operating power level by withdrawal of control rods 45.

As previously brought out, applicant's inventive contirbution to the art is considered to lie in the geometry and arrangement of the components of the active portion, that is in the novel fuel elements 7 and their novel relationship with the novel basic prism elements 6 from which the permanent skeleton structure of the active portion is formed. It will be apparent therefore that the invention is in no way dependent upon the many reactor physics parameters which can be varied within wide limits by the designer depending upon the particular purpose for which the reactor is intended to be employed. Such parameters include the ratio of fissionable material to nonfissionable material, the moderating, absorbing, and scattering properties of the particular materials employed, and so forth. The actual size of the reactor and the actual mass of fissionable material required may be adjusted over a wide range by a suitable choice of these nuclear parameters, in accordance with the well-known principles of reactor physics set forth in the previously referred to Goodman publication. Accordingly, it will be apparent that the principles of the present invention could be applied to very large reactors or to very small reactors. Nevertheless, in the interests of clarity, the design specifications of one example of a reactor incorporating the present invention are fully set forth below:

Hexagonal fuel elements 7

| | |
|---|---|
| Number | 6 per channel in 37 channels=222 |
| Length | 8.5" |
| Width across flats | 7.9" |
| Thickness of fuel plates 14 | 3/16" |
| Spacing between fuel plates | 3/16" |
| Fuel plate material | Be—U alloy, approximately 2% U by weight, U approximately 30% U-235 |
| Material of frames 11 | Be |
| Thickness of frames | 1/4" |
| Material of runners 12 | Graphite |
| Thickness of coolant channel 13 | 3/16" |

Hexagonal prisms 6

| | | |
|---|---|---|
| Material | | Be |
| Thickness | inch | 5/16 |
| Thickness of recess 8 | do | 5/32 |

Active portion and reflector

| | | |
|---|---|---|
| Length of active portion | inches | 51 |
| Mean diameter of hexagon active portion | do | 55.2 |
| Reactor length including end reflectors | do | 94.8 |
| Reactor diameter including radial reflector | do | 98.8 |
| Reflector material | | Be |
| Critical mass of U-235 | kg | 8 |
| Actual mass of U-235 | kg | 11 |

Since many changes could be made in the above construction and many apparently widely different embodiments of this invention could be made without departing from the principles thereof, it is intended that all matter contained in the above description, or shown in the accompanying drawings, shall be interpreted as illustrative and not in a limiting sense.

What is claimed is:

A neutronic reactor comprising a permanent skeleton structure forming a plurality of parallel hexagonally shaped channels extending the entire length thereof, said skeleton structure being formed of a plurality of parallel hollow open-ended hexagonal prisms, a plurality of fuel elements removably disposed within said channels, said fuel elements each comprising a hollow open-ended outer hexagonal frame and a plurality of spaced parallel plates containing fissionable material supported by and within said frame, said frames each being provided with an outwardly projecting runner at each corner to provide coolant passageways between the sides of said frames and the adjacent sides of said prisms, the outer sides of said prisms each being provided with a recess extending their entire length to form coolant passageways between the sides of adjacent prisms.

References Cited in the file of this patent

UNITED STATES PATENTS

| 2,518,270 | Barr | Aug. 8, 1950 |

FOREIGN PATENTS

| 861,390 | France | Oct. 28, 1940 |
| 633,339 | Great Britain | Dec. 12, 1949 |

OTHER REFERENCES

Endeavor (London), vol. 9, April 1950, pages 55, 56 of an article by Cockroft.

Goodman: Science and Engineering of Nuclear Power, vol. 1, p. 187 (1947), Addison Wesley Press, Inc. Cambridge, Mass.

Smyth: "Atomic Energy for Military Purposes," pp. 22, 177, August 1945.

Kelly et al.: Phy. Rev. 73, 1135–9 (1948).

Ohlinger: Nucleonics, vol. 5, No. 6, pp. 38–49, December, 1949; vol. 6, No. 2, pp. 54–63, February 1950.